United States Patent
Kitano

(10) Patent No.: US 8,073,317 B2
(45) Date of Patent: Dec. 6, 2011

(54) POSITIONING DEVICE, SHAKE CORRECTING DEVICE AND ELECTRONICS

(75) Inventor: Kenichi Kitano, Tokyo (JP)

(73) Assignee: Nikon Corporation, Tokyo (JP)

( * ) Notice: Subject to any disclaimer, the term of this patent is extended or adjusted under 35 U.S.C. 154(b) by 261 days.

(21) Appl. No.: 11/812,176

(22) Filed: Jun. 15, 2007

(65) Prior Publication Data

US 2007/0297781 A1    Dec. 27, 2007

(30) Foreign Application Priority Data

Jun. 22, 2006 (JP) ................................ 2006-173058

(51) Int. Cl.
*G03B 17/00* (2006.01)
(52) U.S. Cl. ..................... 396/55; 359/554; 348/208.11
(58) Field of Classification Search ................ 396/55; 348/208.5, 208.2, 208.11; 359/554, 557
See application file for complete search history.

(56) References Cited

U.S. PATENT DOCUMENTS

| | | | | |
|---|---|---|---|---|
| 5,321,923 A * | 6/1994 | Oda | .............................. | 52/167.1 |
| 5,638,222 A * | 6/1997 | Shigehara | ..................... | 359/814 |
| 5,878,004 A | 3/1999 | Miyauchi et al. | | |
| 6,035,134 A * | 3/2000 | Sato et al. | ........................ | 396/55 |
| 6,064,827 A * | 5/2000 | Toyoda | ............................ | 396/55 |
| 6,091,900 A | 7/2000 | Kaneda et al. | | |
| 6,631,042 B2 * | 10/2003 | Noguchi | ........................ | 359/823 |
| 6,985,176 B2 * | 1/2006 | Noguchi | .................. | 348/208.11 |
| 2001/0028516 A1 | 10/2001 | Noguchi | | |
| 2002/0112543 A1 | 8/2002 | Noguchi | | |
| 2003/0123161 A1 * | 7/2003 | Ohno | ............................ | 359/824 |
| 2006/0127074 A1 * | 6/2006 | Noji | ................................ | 396/55 |
| 2007/0212046 A1 * | 9/2007 | Sogoh et al. | .................... | 396/55 |

FOREIGN PATENT DOCUMENTS

| | | |
|---|---|---|
| EP | 1 832 912 A2 | 9/2007 |
| JP | A-07-311368 | 11/1995 |
| JP | A-2002-196382 | 7/2002 |

* cited by examiner

*Primary Examiner* — Clayton E Laballe
*Assistant Examiner* — Linda B Smith
(74) *Attorney, Agent, or Firm* — Oliff & Berridge, PLC

(57) ABSTRACT

A positioning device comprising a moving portion provided with a pair of magnets arranged respectively along with a first axis and a second axis, a fixed portion provided to face to the moving portion, and a voice coil motor (VCM) for relatively driving the moving portion and the fixed portion by an electromagnetic action between a coil and a drive magnet provided to each of the moving portion and the fixed portion: wherein one of the magnets is arranged so as to reduce a rotation moment generated by an electromagnetic connection between the other magnet and the voice coil motor.

17 Claims, 10 Drawing Sheets

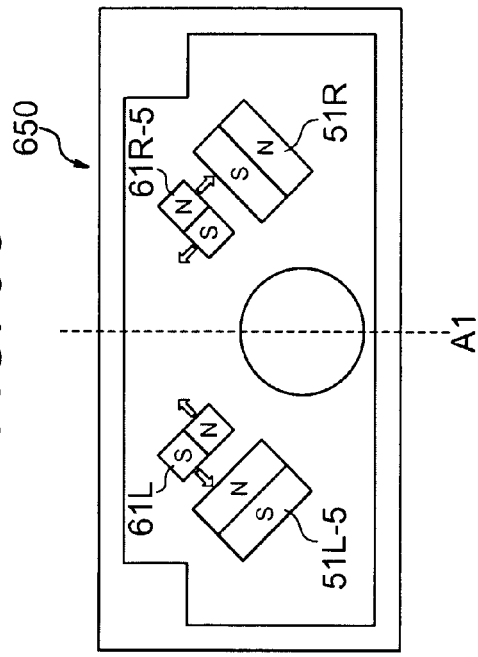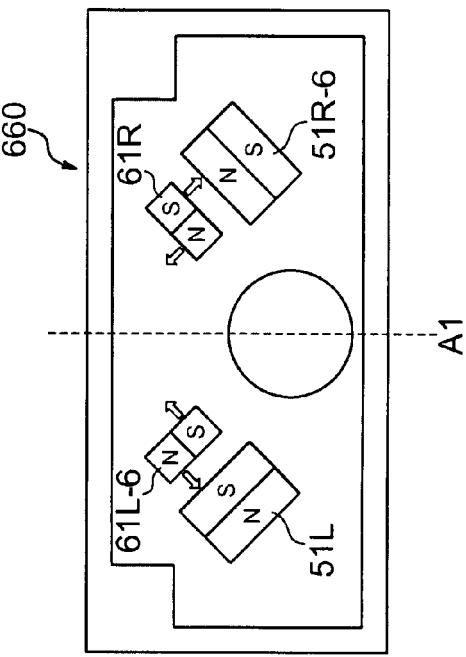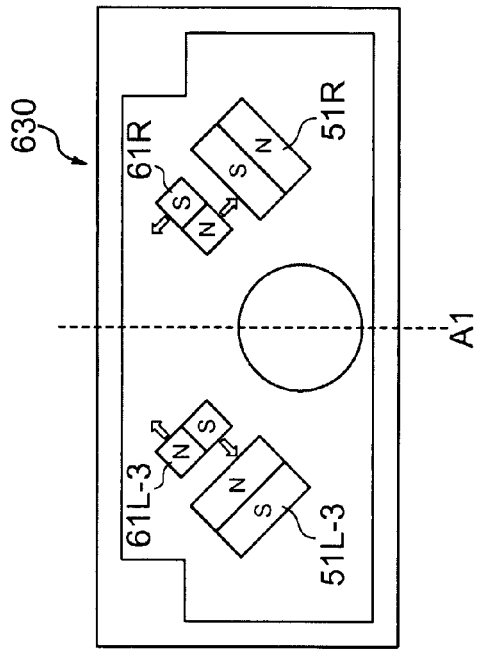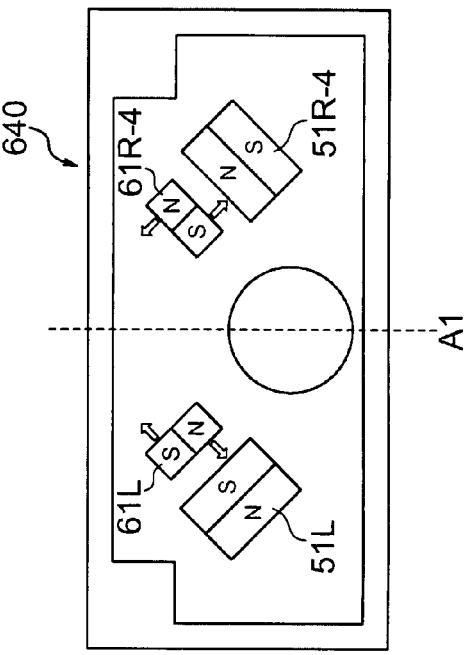

US 8,073,317 B2

POSITIONING DEVICE, SHAKE CORRECTING DEVICE AND ELECTRONICS

INCORPORATION BY REFERENCE

The disclosure of the Japanese Patent Application No. 2006-173058 filed on Jun. 22, 2006 is herein incorporated by reference.

BACKGROUND OF THE INVENTION

1. Field of the Invention

The present invention relates to a positioning device, a shake correcting device, electronics and a production method of the positioning device.

2. Description of the Related Art

A positioning device using a drive unit and a position detecting device is, for example, known as those installed in a camera, etc. (refer to the Japanese Unexamined Patent Publication No. 2002-196382).

A positioning device of the related art as above has had a disadvantage that positioning becomes difficult due to a rotation moment generated between a magnet provided to the drive unit and a magnet provided to the position detecting device.

SUMMARY OF THE INVENTION

An object of the present invention is to provide a positioning device having an improved positioning accuracy, a shake correcting device, electronics, and a production method of the positioning device.

A positioning device of the present invention comprises a first member, a second member, a drive member, a first detection part and a second detection part.

A first member is provided with a first magnet arranged along a first axis and a second magnet arranged along a second axis intersecting with the first axis, and a second member is provided to face to the first member.

A drive member includes a first element provided to the first member and a second element provided to the second member and relatively drives the first member and the second member by an electromagnetic action between the first element and the second element.

A first detection portion detects a relative move of the first member and the second member with respect to the first axis direction in cooperation with the first magnet, and a second detection portion detects a relative move of the first member and the second member with respect to the second axis direction in cooperation with the second magnet.

The first magnet is arranged so as to reduce a rotation moment generated by an electromagnetic connection between the second magnet and the second element.

According to the positioning device of the present invention, a rotation moment generated between the second magnet and the second element is reduced so that the positioning accuracy is improved.

A production method of a positioning device of the present invention comprises the step of forming a mark that identifies magnetic poles on at least one of the first magnet and the second magnet and the step of attaching the magnet having the mark to the first member.

A production method of a positioning device according to another aspect of the present invention comprises the step of forming a mark that identifies magnetic poles on a drive magnet and the step of attaching the drive magnet having the mark to the first member or the second member.

According to a production method of a positioning device of the present invention, magnetic poles of magnets can be easily identified, so that attaching with erroneous magnetic poles can be prevented.

BRIEF DESCRIPTION OF DRAWINGS

These and other objects and features of the present invention will become clearer from the following description of the preferred embodiments given with reference to the attached drawings, in which:

FIG. 8A to FIG. 8D are views each showing a shake correcting device of an embodiment or a modified embodiment;

DESCRIPTION OF THE PREFERRED EMBODIMENT

Below, the present invention will be explained further in detail by using embodiments with reference to the drawings. Note that the embodiments below will be explained by taking an example of a digital camera as electronics.

First and Second Embodiments

Figure 1:
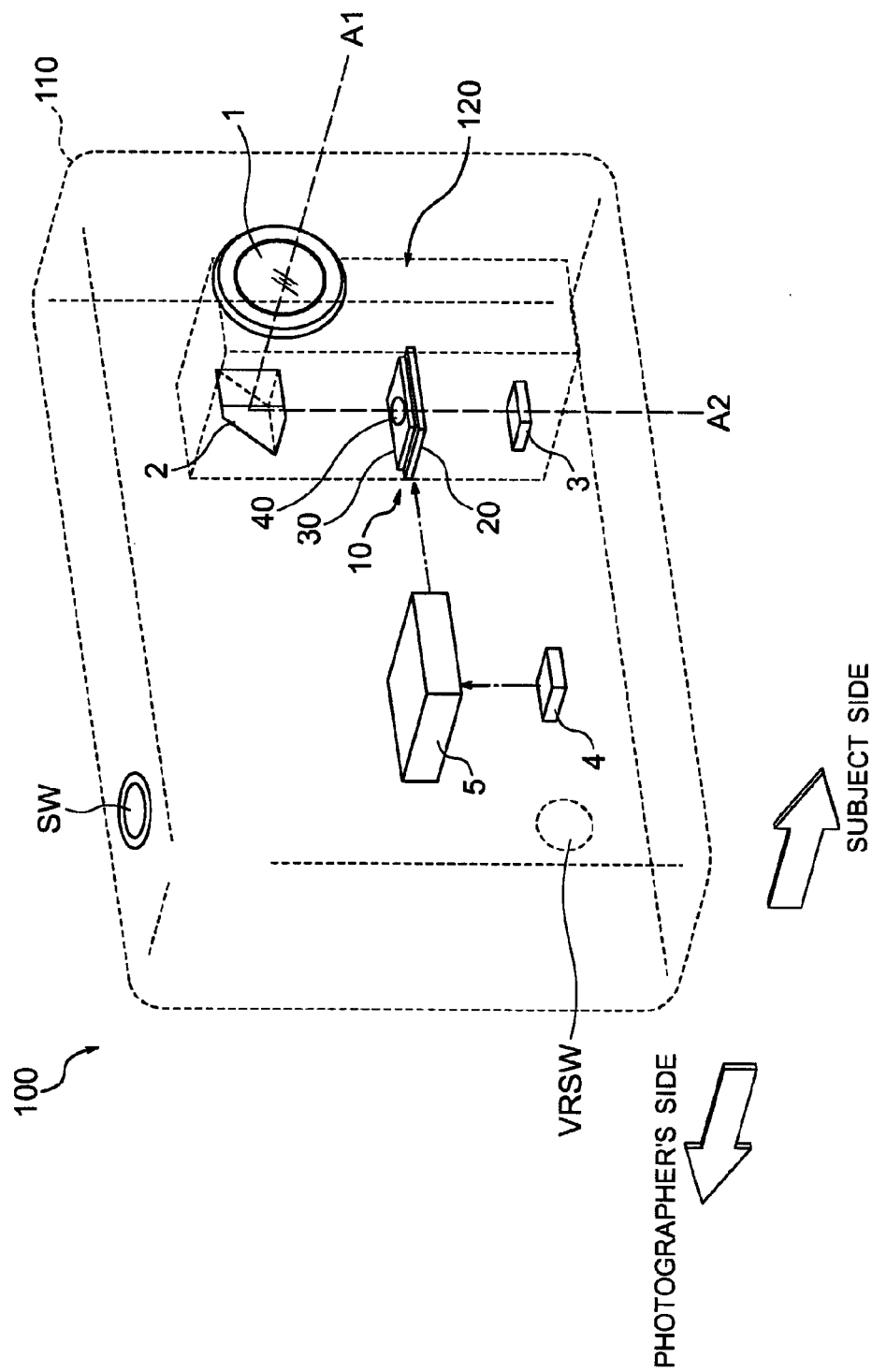
FIG. 1 is a perspective view showing a digital camera according to a first embodiment.

FIG. 1 is a perspective view showing a digital camera according to first and second embodiments.

Figure 2A:
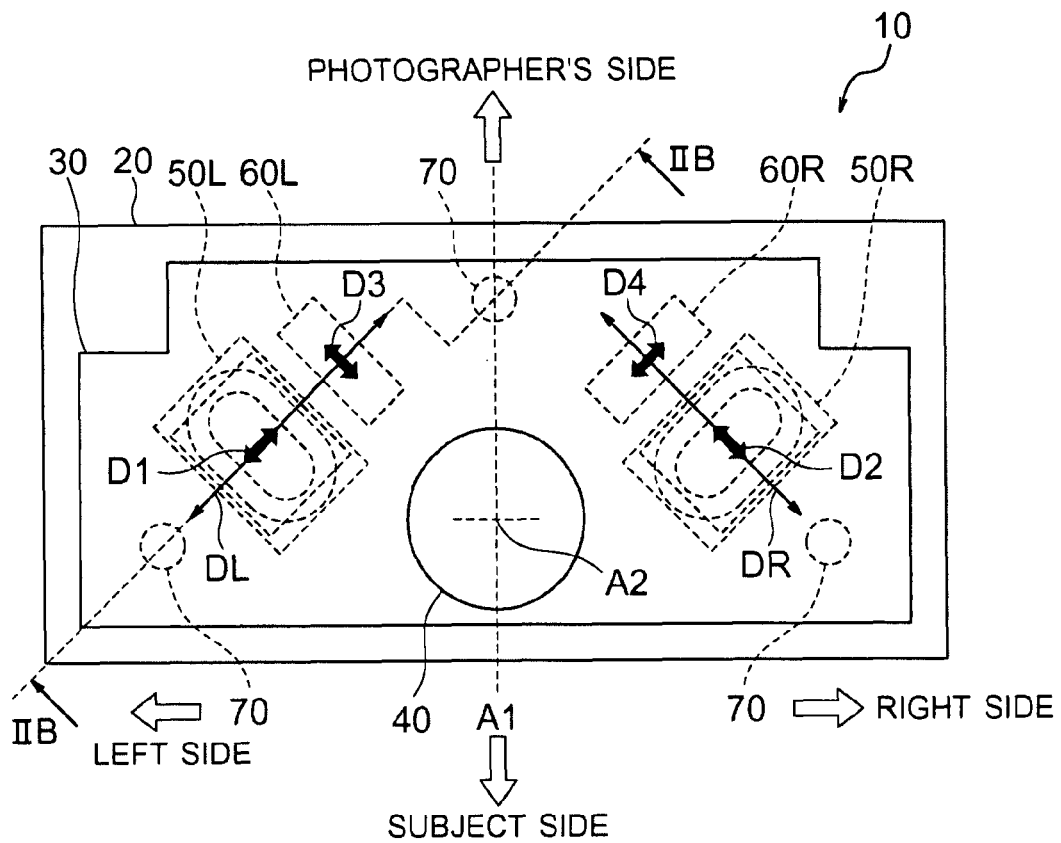
FIG. 2A and FIG. 2B are views showing a shake correcting device installed in the digital camera shown in FIG. 1.
Figure 2B:
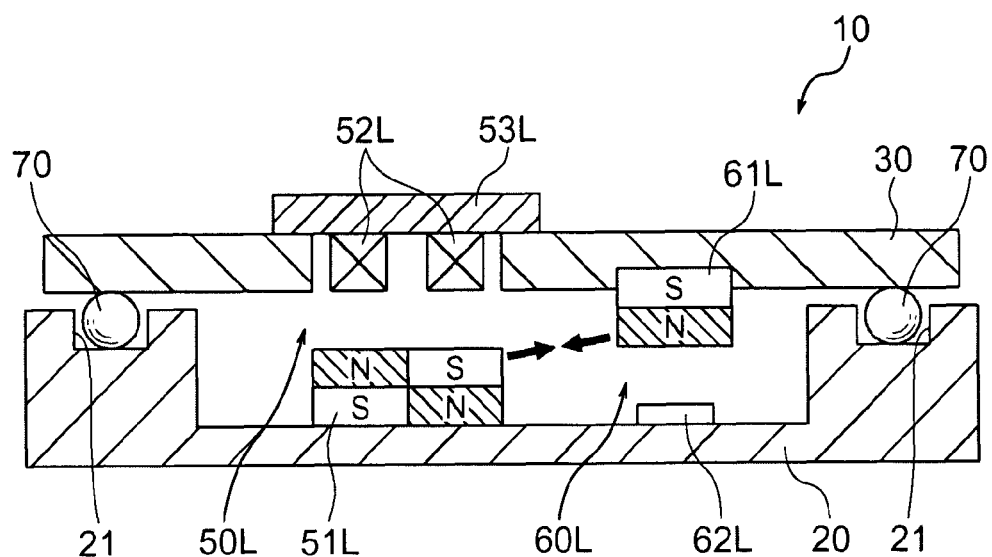

FIG. 2A and FIG. 2B are views showing a shake correcting device installed in the digital camera shown in FIG. 1, wherein FIG. 2A is a plan view of the shake correcting device and FIG. 2B is a sectional view along IIB-IIB in FIG. 2A.

A digital camera 100 (hereinafter, referred to as a camera 100) is a camera with an unchangeable lens and comprises a body 110 and a lens barrel 120.

The body 110 is a box-shaped container having a space inside and is formed to be an approximately rectangular parallelepiped shape, for example, made by a synthetic resin and a metal material, such as an aluminum alloy.

The lens tube 120 is held in the space inside the body 110 and comprises a first lens group 1, a prism 2, a CCD (Charge Coupled Device) 3 and a shake correcting device 10. A switch SW is a switch used, for example, for a shutter release operation and control of the shake correcting device, etc. The switch SW is provided on the opposite side of the first lens group 1 in the body 110. A switch VRSW is a switch used for operating of activating or deactivating the shake correcting device. The switch VRSW is provided on the opposite side of the first lens group 1 in the body 110.

The first lens group 1 is provided to the closest side to a subject of shooting in an image pickup optical system held in the lens tube 120. The first lens group 1 is arranged on a plane facing to a subject among planes of the body 110 in a state that the incident surface is exposed.

The prism 2 is arranged on the emitting side of the first lens group 1 inside the body 110 and is a right angle prism for totally reflecting a light emitted from the first lens group 1 to bend the direction, for example, by 90°.

Below, an image pickup optical system of the camera 100 will be explained by giving reference numbers A1 and A2 to a light axis on the incident side and a light axis on the emitting side of the prism 2, respectively.

The CCD 3 is a photoelectric conversion element for converting a subject image light obtained by the image pickup optical system of the camera 100 including the first lens group 1 to an electric signal. The CCD 3 is arranged on the emitting side of the prism 2 and vertically below the prism 2 in a normal shooting position of the camera 100. Note that, in the camera 100, for example, a CMOS (Complementary Metal Oxide Semiconductor), etc. may be used as its image pickup device.

Here, in the present specification, the normal shooting position of the camera 100 indicates a posture of the camera 100 when shooting a landscape-oriented image by setting the optical axis A1 approximately horizontal.

An image pickup surface of the CCD 3 becomes approximately horizontal in a state that the camera 100 is at the normal shooting position.

Note that, while omitted in FIG. 1, the lens tube 120 is provided with a plurality of lens groups including a zoom lens and a focus lens between the first lens group 1 and the prism 2 and between the prism 2 and the CCD 3.

The shake correcting device 10 is arranged on the light axis A2 between the prism 2 and the CCD 3.

The shake correcting device 10 comprises, as shown in FIG. 2A and FIG. 2B, a fixed portion 20, a moving portion 30, a shake correcting lens 40, a voice coil motor 50 (hereinafter, also referred to as a VCM50), a position detecting portion 60 and a steel ball 70.

Here, an arrangement of respective elements provided to the shake correcting device 10 will be explained based on a state where the moving portion 30 is placed to be at the center with respect to the fixed portion 20. The state where the moving portion 30 is placed to be at the center indicates the state where a light axis of the shake correcting lens 40 substantially matches with the light axis A2 of the shake correcting lens 40.

The shake correcting device 10 is for reducing an influence of shaking, etc. at shooting by detecting an inclination angle of the camera 100 by a gyro sensor 4 fixed to inside of the body 110 shown in FIG. 1 and moving the shake correcting lens 40 by driving the moving portion 30 with respect to the fixed portion 20 on a plane perpendicular to the light axis A2 in accordance with the inclination angle by the VCM 50. Driving of the VCM 50 is controlled by a control device 5 shown in FIG. 1.

The fixed portion 20 is a base of the shake correcting device 10 fixed to the lens tube 120. The moving portion 30 is supported to be movable on a plane perpendicular to the light axis A2 with respect to the fixed portion 20. The moving portion 30 is arranged on the closer side to the prism 2 than the fixed portion 20.

The fixed portion 20 and the moving portion 30 are, as shown in FIG. 2, formed to be an approximately rectangular plate shape when seeing from the light axis A2 direction, wherein a size in the direction perpendicular to the light axis A1 and the light axis A2 (The right and left direction in FIG. 2A. Hereinafter, it will be also referred to as a longitudinal direction.) is longer than a size in the direction in parallel with the light axis A1 (the up and down direction in FIG. 2A).

The shake correcting lens 40 is attached to a region on the photographer's side of the moving portion 30 and at the approximately center portion in the longitudinal direction.

The voice coil motor 50 is an electromagnetic actuator for driving the moving portion 30 on a plane perpendicular to the light axis A2 with respect to the fixed portion 20.

The VCM 50 is arranged by a pair sandwiching the shake correcting lens 40 and away from each other in the longitudinal direction of the fixed portion 20 and the moving portion 30.

Below, the VCM 50, a later explained position detecting portion 60, and elements included therein will be explained by adding "R" to reference numbers of those arranged on the right side of the light axis A2 and "L" to reference numbers of those arranged on the left side.

Driving directions (thrust directions) D1 and D2 of the moving portion 30 by the VCM 50L and VCM 50R are, for example, oblique by 45° with respect to the longitudinal direction of the fixed portion 20 and the moving portion 30, respectively. There is an effect of simplifying calculations relating to the trigonometric function when the oblique angle is 45°. However, it does not have to be 45°.

Here, when assuming that an axis line passing through the VCM 50L and in parallel with the driving direction D1 is a drive axis line DL and that an axis line passing through the VCM 50R and in parallel with the driving direction D2 is a drive axis line DR, a crossing point of the drive axis line DL and the drive axis line DR is arranged on a plane including the light axis A1 and the light axis A2 and on a region closer to the subject of shooting than the light axis A2.

The VCM 50L comprises, as shown in FIG. 2B, a magnet 51L, a coil 52L and a yoke 53L.

The magnet 51L is a permanent magnet fixed to the fixed portion 20 in a state of facing to the moving portion 30. An arrangement of the magnet poles of the magnet 51L (and magnet 51R) will be explained in detail later on.

The coil 52L is an electric winding fixed to the moving portion 30 in a state of facing to the magnet 51L.

The yoke 53L is a magnetic material formed, for example, by a steel based metal material, etc. to be in a plate shape. The yoke 53L is fixed to the moving portion 30 in a state of facing to the opposite surface of a surface of the coil 52L facing to the magnet 51L.

The VCM 50R also has the same structure as that of the VCM 50L explained above.

The position detecting portion 60 is a position sensor for detecting a position of the moving portion 30 within a plane perpendicular to the light axis A2 with respect to the fixed portion 20.

The position detecting portion 60 is arranged in a pair being away from each other in the longitudinal direction of the fixed portion 20 and the moving portion 30 and on both sides of a plane including the light axis A1 and the light axis A2 in the same way as the VCM 50. These position detecting portions 60L and 60R are respectively arranged on the drive axis lines DL and DR of the VCM 50L and 50R and on a region on the subject side of the shake correcting device 10.

The position detecting portion 60L is arranged next to the VCM 50L, and an axis line direction D3 of the detection axis is in parallel with the driving direction D2 of the VCM 50R.

On the other hand, the position detecting portion 60R is arranged next to the VCM 50R, and an axis line direction D4 of the detection axis is in parallel with the driving direction D1 of the VCM 50L.

Also, the position detecting portions 60L and 60R are arranged, so that their detection axes cross on a light axis of the shake correcting lens 40.

The position detecting portion 60L is provided with a magnet 61L and a hall element 62L.

The magnet 61L is a permanent magnet fixed to the moving portion 30 in a state of facing to the fixed portion 20. An arrangement of magnetic poles of the magnet 61L (and magnet 61R) will be explained in detail later on.

The hall element 62L is a magnetic sensor fixed to the fixed portion 20 in a state of facing to the magnet 61L. The hall element 62L is for detecting a change of a magnetic field of the magnet 61L in accordance with a displacement of the moving portion 30 with respect to the fixed portion 20.

Note that the position detecting portion 60R has the same structure as that of the position detecting portion 60L explained above.

The steel balls 70 are rolling elements for supporting the moving portion 30 to be movable within a plane perpendicular to the light axis A2 with respect to the fixed portion 20.

Each of the steel balls 70 is held in a recessed portion 21 of the fixed portion 20, formed on a surface portion thereof facing to the moving portion 30, and held by being sandwiched between a bottom surface of the recessed portion 21 and the facing surface of the moving portion 30.

The steel balls 70 are provided, for example, by the number of three as shown in FIG. 2A. One of the steel balls 70 is arranged at an end portion on the subject side of the shake correcting device 10, which is approximately the center of the fixed portion 30 in the longitudinal direction. Also, other two steel balls 70 are respectively arranged at the end portion on the subject side of the shake correcting device 10, being close to longitudinal right and left end portions of the fixed portion 20.

Note that the moving portion 30 is kept free from dropping out from the fixed portion 20 because the magnets 51L and 51R fixed to the fixed portion 20 magnetically attract the yokes 53L and 53R fixed to the moving portion 30 side facing thereto.

Next, an arrangement of magnetic poles of the magnets 51 provided to the VCM 50 and an arrangement of magnetic poles of the magnets 61 provided to the position detecting portion 60 will be explained.

Figure 3A:
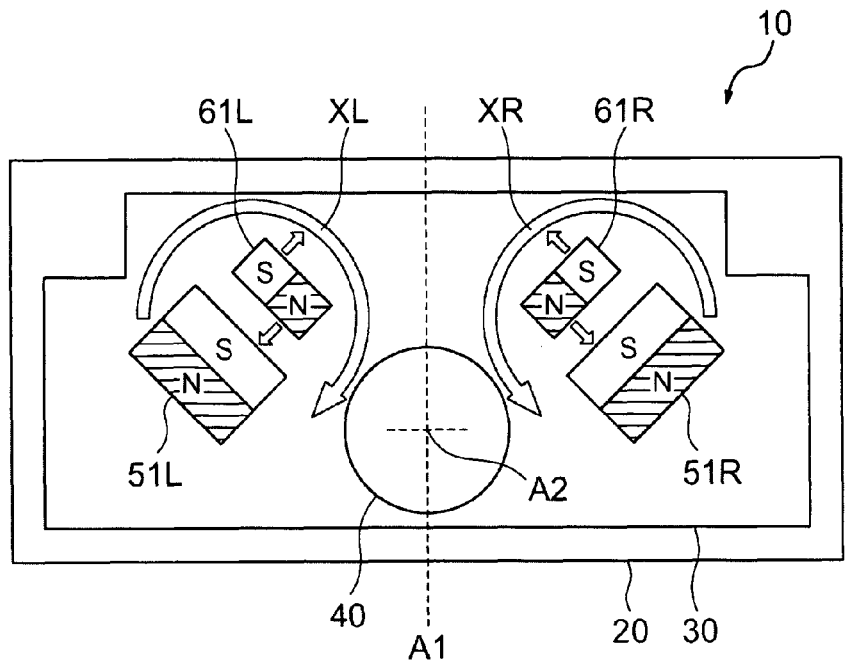
FIG. 3A and FIG. 3B are views showing an arrangement of magnetic poles of magnets provided to a VCM of the shake correcting device and an arrangement of magnetic poles of magnets provided to the position detecting part in FIG. 2A and FIG. 2B.
Figure 3B:
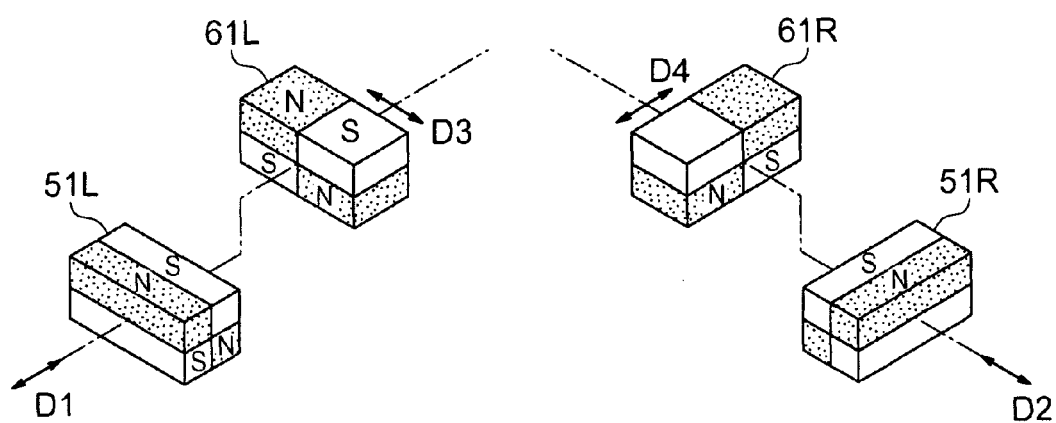

FIG. 3A and FIG. 3B are views each showing an arrangement of magnetic poles of the magnets 51 provided to the VCM 50 and an arrangement of magnetic poles of the magnets 61 provided to the position detecting portion 60, wherein FIG. 3A is a plan view of the shake correcting device 10 seeing from the light axis A2 direction and FIG. 3B is a perspective view showing only the magnets 51 and 61.

Note that, in FIG. 3A, an arrangement of magnetic poles of the magnets 51 is when seeing the fixed portion 20 from the prism 2 side and an arrangement of magnetic poles of the magnets 61 is when seeing the moving portion 30 from the CCD 3 side.

The magnet 51L of the VCM 50L is a multipole magnet formed to be in a rectangular parallelepiped shape.

The magnet 51L is formed, as shown in FIG. 2 and FIG. 3, by superimposing in the direction of the light axis A2 two plate-shaped magnets, wherein the south pole and north pole are arranged to be mutually opposite directions along the drive direction D1 of the VCM 50L.

Also, in the magnet 51L, the south pole is arranged at the closest part to the magnet 61L of the position detecting part 60L.

The magnet 61L of the position detecting portion 60L is also a multipole magnet formed to be in a rectangular parallelepiped shape in the same way as the magnet 51L of the VCM 50L.

The magnet 61L is formed by superimposing in the light axis A2 direction two plate-shaped magnets, wherein the south pole and the north pole are arranged in the mutually opposite directions along the axis line direction D3 of a detection axis of the position detecting portion 60L.

Also, in the magnet 61L, the north pole is arranged to be close to the shake correcting lens 40 at the closest part to the magnet 51L of the VCM 50L (refer to FIG. 3A and FIG. 3B).

The magnet 51R of the VCM 50R and the magnet 61R of the position detecting portion 60R respectively have the same structures as those of the magnet 51L and the magnet 61L, and an arrangement of the magnetic poles is in a plane symmetry with respect to a reference plane including the light axis A1 and the light axis A2.

Next, an effect of the shake correcting device 10 of the first embodiment will be explained by comparing with comparative embodiments.

Note that, in the comparative embodiments and other embodiments explained below, parts having the same function as that in the first and second embodiments explained above are given the same reference number or added with a common reference number at their tail ends, so that overlapping explanations and drawings are omitted appropriately.

As shown in FIG. 3A, in the magnet 61L, the north pole is arranged closer to the center side of the shake correcting device 10 than the south pole at the closest part to the magnet 51L; and in the magnet 51L, the south pole is arranged at the closest part to the magnet 61L.

Accordingly, due to an attraction force and a repulsive force generated between the magnet 51L and the magnet 61L, when seeing the shake correcting device 10 from the prism 2 side, a rotation moment for rotating the moving portion 30 in the clockwise direction with respect to the fixed portion 20 is generated between the magnet 51L and the magnet 61L (refer to an arrow XL in FIG. 3A).

On the other hand, as shown in FIG. 3A, in the magnet 61R, the north pole is arranged closer to the center side of the shake correcting device 10 than the south pole at a part closest to the magnet 51R; and in the magnet 51R, the south pole is arranged at a part closest to the magnet 61R.

Accordingly, between the magnet 51R and the magnet 61R, a rotation moment for rotating the moving portion 30 in the anticlockwise direction with respect to the fixed portion 20 is generated (refer to an arrow XR in FIG. 3A).

As explained above, in the shake correcting device 10 in the first embodiment, the direction of the rotation moment generated between the magnet 51L and the magnet 61L becomes inverse of the direction of the rotation moment generated between the magnet 51R and the magnet 61R.

Here, as a comparative embodiment of the shake correcting device 10 of the first embodiment, for example, a shake correcting device wherein an arrangement of the magnetic poles of the magnets 61 is inverse of that in the first embodiment will be considered.

Figure 4A:
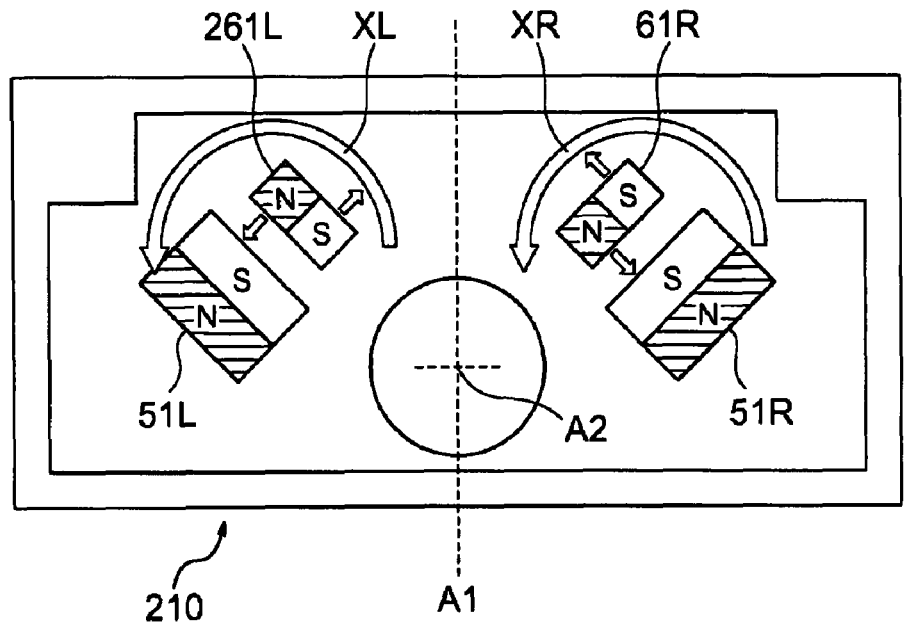
FIG. 4A and FIG. 4B are views each showing an arrangement of magnetic poles of magnets in a shake correcting device of a comparative embodiment.
Figure 4B:
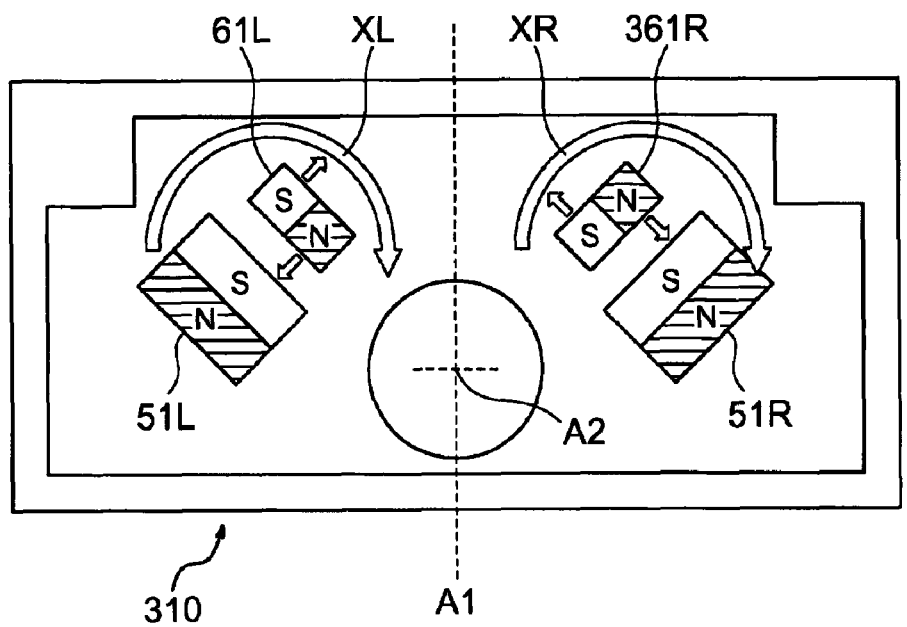

FIG. 4A and FIG. 4B are views each showing an arrangement of magnetic poles of magnets in a shake correcting device of a comparative embodiment, wherein shake correcting devices of a first comparative embodiment and a second comparative embodiment are shown, respectively.

A shake correcting device 210 of the first comparative embodiment shown in FIG. 4A is provided with a magnet 261L having an inversed arrangement of a south pole and north pole instead of the magnet 61L of the first embodiment.

In the shake correcting device 210 of the first comparative embodiment, a rotation moment generated between the magnet 51R and the magnet 61R (refer to an arrow XR in FIG. 4A) is anticlockwise as same as in the first embodiment.

On the other hand, in the magnet 261L, the south pole is arranged closer to the center side of the shake correcting device 210 than the north pole, so that an anticlockwise rotation moment as same as the rotation moment generated between the magnet 51R and the magnet 61R is generated between the magnet 51L and the magnet 261L (refer to an arrow XL in FIG. 4A).

A shake correcting device 310 of a second comparative embodiment is provided with a magnet 361R having an inversed arrangement of a south pole and a north pole instead of the magnet 61R of the first embodiment.

In the shake correcting device 310 of the second comparative embodiment, directions of rotation moments respectively generated between two magnets arranged close to each other become the same (refer to arrows XL and XR in FIG. 4B) in the same way as in the first comparative embodiment.

In each of the shake correcting devices 210 and 310 of the first and second comparative embodiments explained above, since the directions of rotation moments respectively generated between magnets close to each other are the same, a rotation moment for rotating the moving portion 30 with respect to the fixed portion 20 is generated by combining the two rotation moments.

FIG. 5A to FIG. 5D are views each showing a relationship of an arrangement of magnetic poles of magnets and a direction of a rotation moment acting on the moving portion. In each of FIG. 5A to FIG. 5D, a view on the left shows an arrangement of magnetic poles and a view on the right shows a state of the moving portion.

Figure 5A:
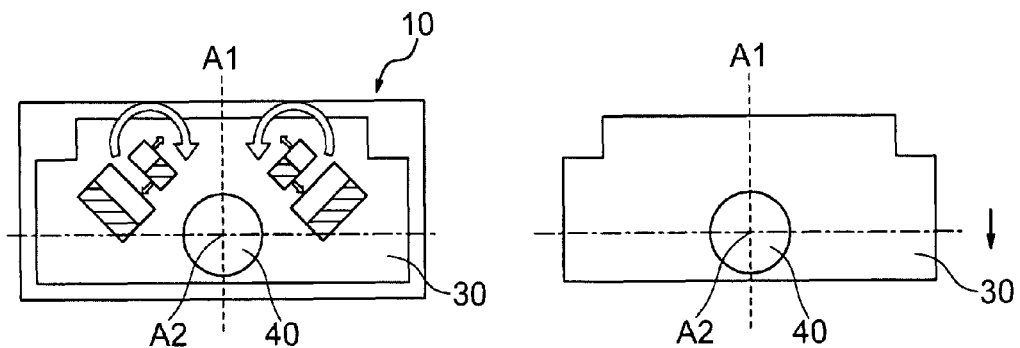
FIG. 5A to FIG. 5D are views each showing a relationship between an arrangement of magnetic poles of magnets provided to a shake correcting device and a rotation moment acting on the moving portion in an embodiment or a comparative embodiment.

FIG. 5A shows the shake correcting device 10 of the first embodiment.

In the shake correcting device 10, since directions of rotation moments respectively generated between magnets are inverse, the rotation moments are countered by each other and a rotation moment acting on the moving portion 30 is reduced. In the shake correcting device 10 of the first embodiment, the moving portion 30 moves approximately in parallel with the light axis A1 toward the photographer side with respect to the fixed portion 20.

Figure 5B:
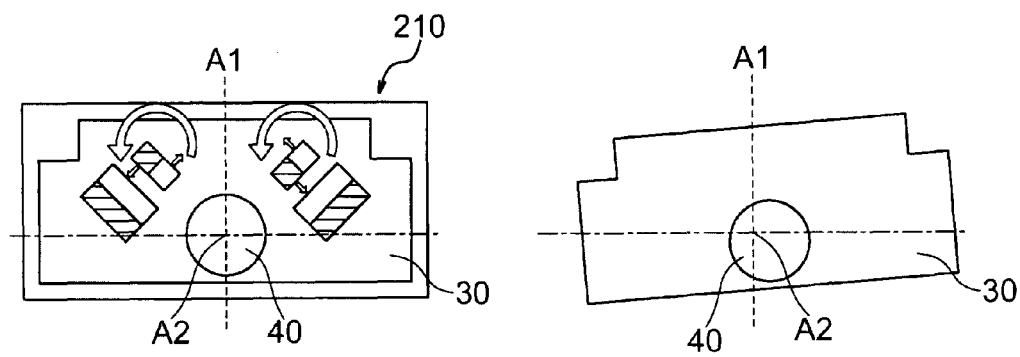

FIG. 5B shows the shake correcting device 210 of the first comparative embodiment.

In the shake correcting device 210, the directions of rotation moments respectively generated between magnets are the same and both of the directions are anticlockwise, so that a rotation moment for rotating in the anticlockwise direction acts on the moving portion 30 with respect to the fixed portion 20.

Also, a rotation center of the rotation moment is not on the light axis A2, so that a light axis of the shake correcting lens 40 becomes out of the light axis A2.

Figure 5C:
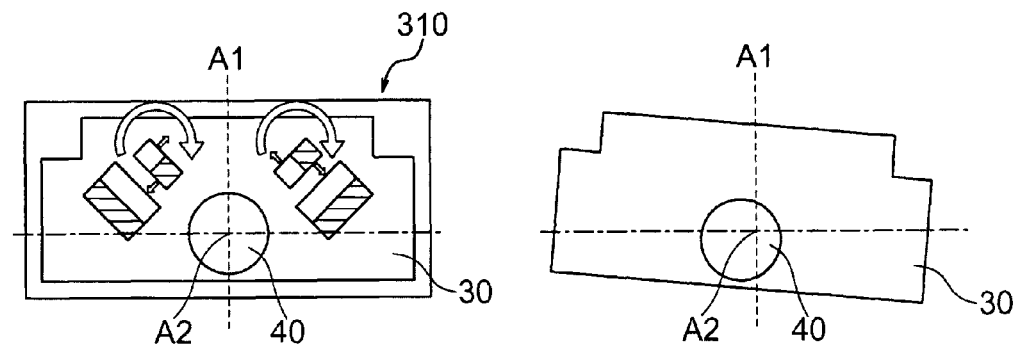

FIG. 5C shows the shake correcting device 310 of the second comparative embodiment.

In the shake correcting device 310, an anticlockwise rotation moment acts on the moving portion 30, so that the moving portion 30 rotates anticlockwise with respect to the fixed portion 20 and a light axis of the shake correcting lens 40 becomes out of the light axis A2 in the same way as in the first comparative embodiment.

Figure 5D:
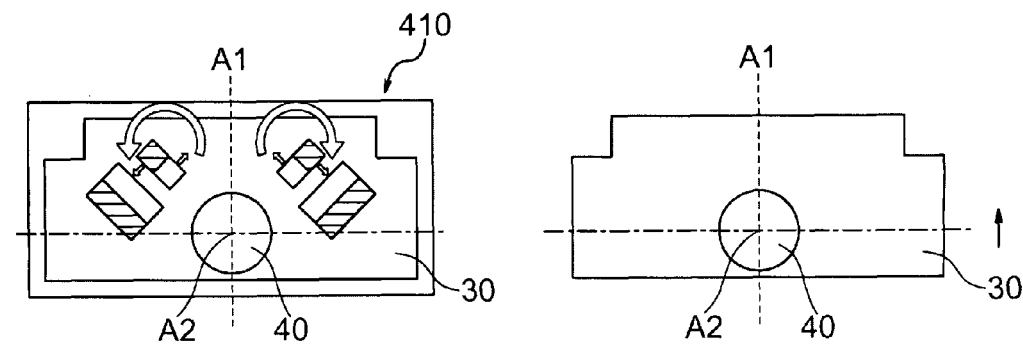

FIG. 5D shows a shake correcting device 410 of the second embodiment, wherein directions of rotation moments respectively generated between magnets are inverse in the same way as in the first embodiment. Note that directions of the rotation moments respectively generated between magnets are opposite from those in the first embodiment.

In the shake correcting device 410, rotation moments for acting on the moving portion 30 are countered by each other in the same way as in the shake correcting device 10 of the first embodiment and the moving portion 30 moves approximately in parallel with the light axis A1 to the subject side with respect to the fixed portion 20.

Here, it becomes difficult for the position detecting portion 60 of the shake correcting device to accurately detect a position of the moving portion 30 with respect to the fixed portion 20 in a state where the rotation moment acts on the moving portion 30 in the same way as in the first comparative example and the second comparative example.

Also, in the first comparative embodiment and the second comparative embodiment, when a rotation amount of the moving portion 30 is large, the magnets 61 and the hall element 62 become distant and position detection may become impossible by the position detecting portion 60.

On the other hand, the shake correcting device 10 of the first embodiment and the shake correcting device 410 of the second embodiment, the moving portion 30 moves approximately in parallel with the light axis A1, so that an output of the position detecting portion 60 can be easily corrected and position detection of the moving portion 30 can be accurately made.

Also, since rotation of the moving portion 30 with respect to the fixed portion 20 can be reduced, it is not necessary to provide a rotation stopper, etc., alternately, a compact rotation stopper for handling a small rotation load may be used and the shake correcting devices 10 and 410 can be made compact.

Third Embodiment

Next, a digital camera as a third embodiment of electronics will be explained.

Figure 6:
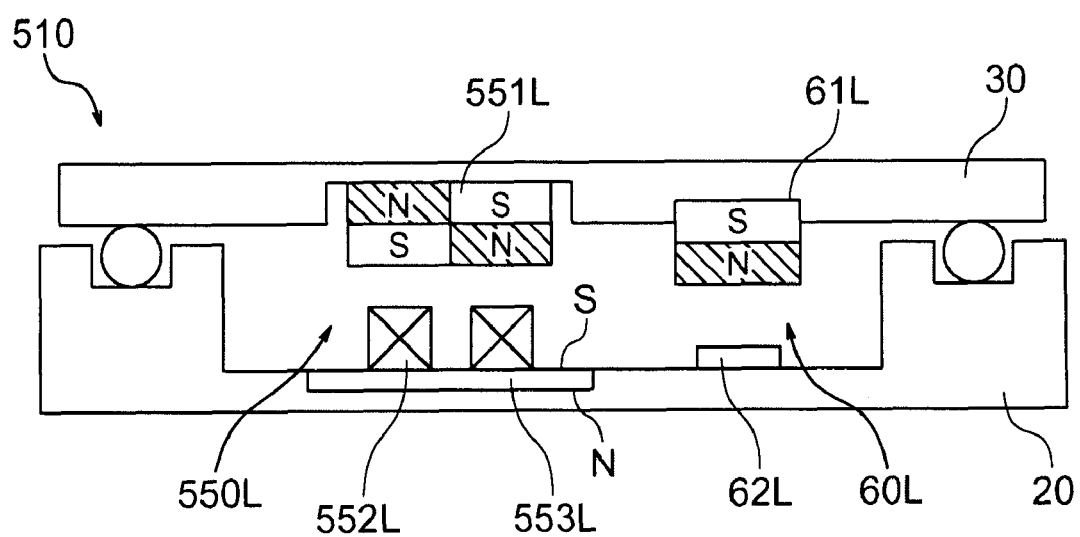
FIG. 6 is a view showing a shake correcting device according to a third embodiment.

FIG. 6 is a view showing a shake correcting device 510 provided to a digital camera of a third embodiment and is a view corresponding to FIG. 2B showing the shake correcting device 10 of the first embodiment.

The digital camera of the third embodiment is provided with a shake correcting device 510 wherein an arrangement of magnets 51, coils 52 and yokes 53 is different from that in the shake correcting device 10 of the first embodiment.

The VCM 550L (a VCM used for driving in the D1 direction) of the shake correcting device 510 comprises a magnet 551L, a coil 552L and a yoke 553L.

The magnet 551L is fixed to the moving portion 30 in a state of facing to the fixed portion 20.

The coils 552L are fixed to the fixed portion 20 via the yoke 553L in a state of facing to the magnet 551L.

The yoke 553L is fixed to the fixed portion in a state of facing to an opposite surface of a surface of the coils 552L facing to the magnet 551L.

The magnet 551L is a multipole magnet as same as the magnet 51 of the first embodiment, wherein the north pole is arranged to be close to the magnet 61L of the position detecting portion 60L at a part facing to the yoke 553L.

Here, in the shake correcting device 510, the yoke 553L is magnetized by the magnet 551L. As a result, the yoke 553L functions as a magnet, wherein the south pole is arranged at the closest part to the magnet 61L of the position detecting portion 60L, that is, in the same way as the magnet 51L of the first embodiment.

A not shown yoke 553R provided to a not shown VCM 550R (a VCM used for driving in the D2 direction) is also magnetized by a magnet 551R of the VCM 550R and functions in the same way as the magnet 51R of the first embodiment.

As explained above, the shake correcting device 510 of the third embodiment is capable of preventing the moving portion 30 from rotating with respect to the fixed portion 20 by arranging the magnet 551 and the magnet 61 so as to balance out the rotation moments respectively generated between magnets. As a result, the shake correcting device 510 is capable of accurately detecting a position of the moving portion 30.

Furthermore, in the shake correcting device 510 of the third embodiment, the coils 552 are provided to the fixed portion 20, so that handling of wiring, etc. is easier and a move of the moving portion 30 is smoother comparing with that in the first embodiment wherein the coil 52 is provided to the moving portion 30 side.

[Embodiment of Production Method]

In the shake correcting devices of the embodiments, a direction of arranging magnetic poles of the magnets 51L and 51R and magnets 61L and 61R is significant and, when the magnetic pole direction is erroneously arranged, the effect of the embodiments cannot be brought out. Therefore, the magnets 51L, 51R, 61L and 61R are added with a mark "M" for identifying the magnetic poles.

Figure 9A:
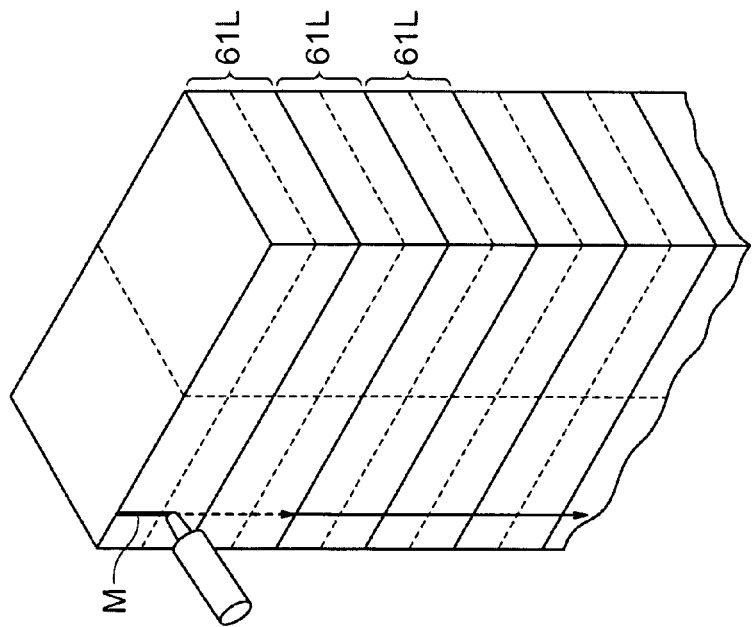
FIG. 9A and FIG. 9B are perspective views each showing magnets in an embodiment.

The magnet 61L shown in FIG. 3B will be taken as an example for the explanation. FIG. 9A is a perspective view showing the magnet 61L, which is a multipole magnet formed to be in a rectangular parallelepiped shape by superimposing and bonding two plate-shaped magnets as explained above. The magnet 61L of this example is produced by casting or sintering ferrite or other magnetic body, then, processing the result to be in a desired shape and magnetizing to a south pole and a north pole. For preventing oxidization and scratches, plating processing of nickel, etc. is furthermore performed after the magnetization.

Then, two plate-shaped magnets are superimposed and bonded, and on any one of six surfaces of the thus obtained magnet 61L, a magnetic pole identification mark "M" is formed by an ink, etc. as shown in FIG. 9A.

Figure 9B:
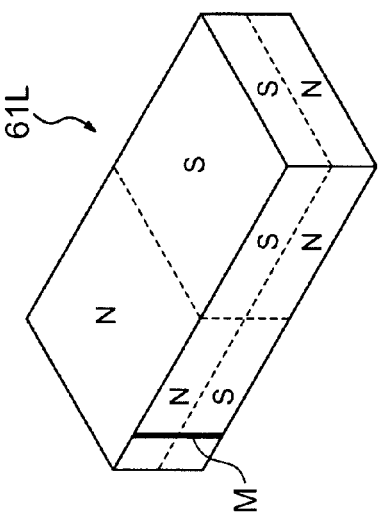
Figure 9C:
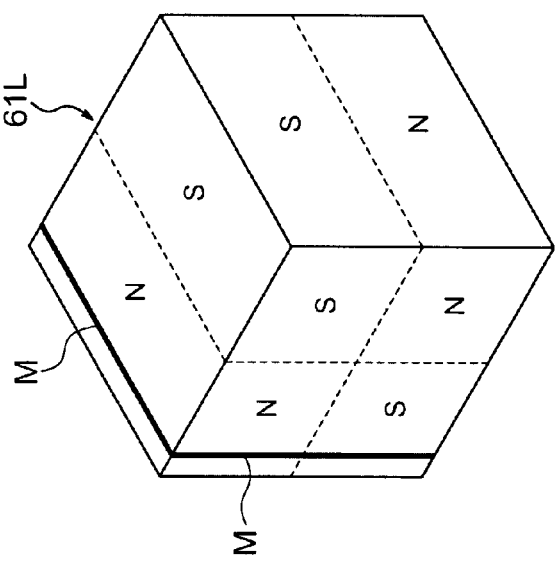
FIG. 9C is a perspective view showing an embodiment wherein marks are added to magnets.

When giving the magnetic pole identification mark "M", as shown in FIG. 9C, it is possible to give the marks in a short time by stacking a plurality of magnets 61L so that their directions of magnetic poles become the same and giving the marks at a time.

Note that, in the case of the magnet 61L in a rectangular parallelepiped shape shown in FIG. 9A and FIG. 9B, a direction of magnetic poles of the magnet 61L can be identified only by giving the magnetic pole identification mark "M" to any one of the six surfaces. However, the mark "M" may be given to two or more surfaces of the magnet 61L in a rectangular parallelepiped shape.

The mark "M" may be given at the center of a surface of the magnet 61L or at the outlaying part. Also, the mark "M" may be marked, for example, by an ink or paint in a different color from a surface color of the magnet 61L or by emboss or a groove. Alternately, the mark "M" may be a figure, such as a line, dot, triangle, square and circle, and two or more marks "M" may be given.

As shown in FIG. 9A, in an operation of attaching the magnet 61L having a magnetic pole identification mark "M" thereon to the moving portion 30, a position of the magnetic pole identification mark "M" with respect to the moving portion 30 in accordance with an arrangement of the magnet poles is determined as an operation standard. Other magnets 61R, 51L and 51R are also added with the same magnetic pole identification mark "M".

Figure 10:
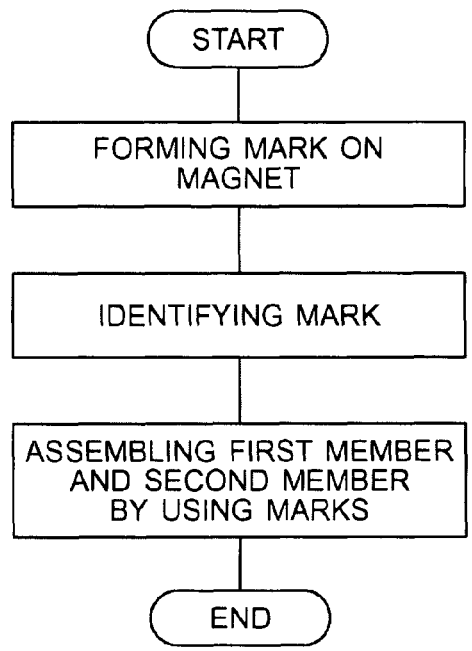
FIG. 10 is a flowchart showing a production method of an embodiment.
Figure 11:
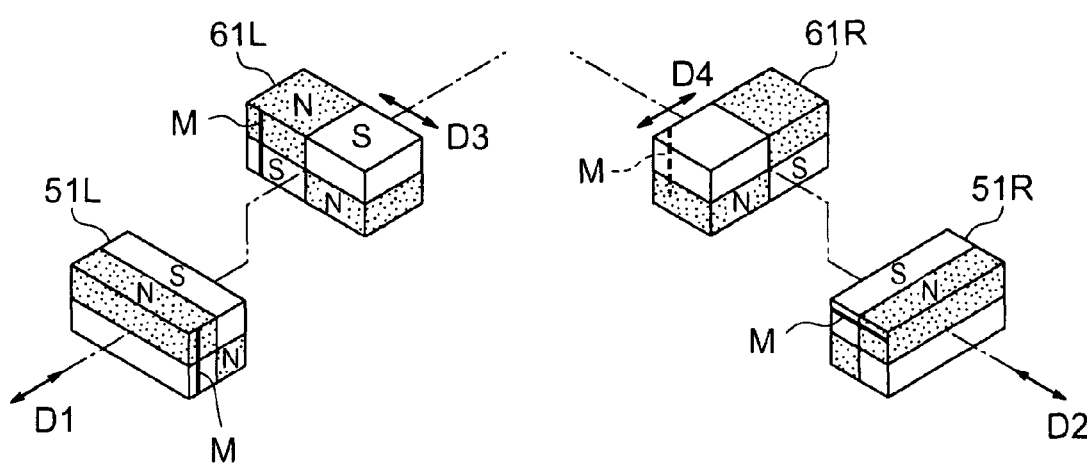
FIG. 11 is a view showing an arrangement of magnetic poles of magnets provided to a VCM of the shake correcting device in FIG. 2A and FIG. 2B and a positional relationship of an arrangement of magnetic poles of magnets provided to a position detecting portion and marks.

Next, with reference to FIG. 10, a production method of a positioning device of the present embodiment will be explained. In the production method of a positioning device of the present embodiment, first, magnetic pole identification marks "M" are formed on the magnets 61L, 61R, 51L and 51R as shown in FIG. 11. Next, the magnetic pole identification marks "M" are identified by an operator or by an automatic assembling device, etc. Next, by using the magnetic pole identification marks "M", the fixed portion 20 (refer to FIG. 2A) and the moving portion 30 (refer to FIG. 2A) are assembled. Directions of magnetic poles of magnets can be identified by the magnetic pole identification marks "M", so that assembling with an erroneous direction of magnetic poles can be prevented.

[Modified Embodiment]

The present invention is not limited to the embodiments explained above and may be variously modified and changed, and the modifications and changes are also included in the technical scope of the present invention.

(1) The configurations of the positioning device, shake correcting device and electronics of the present invention are not limited to those in the embodiments and may be suitably modified. For example, electronics of the embodiments was a digital camera, but the electronics is not limited to that and may be, for example, a film camera, a video camera, a cellular phone, an interchangeable lens tube including a shake correcting device or an unchangeable lens tube integrally incorporated in a camera.

Also, the shake correcting devices of the embodiments were a lens shift type for driving a shake correcting lens on a plane perpendicular to a light axis, however, the present invention is not limited to that and may be a type of attaching an image pickup element, such as a CCD, to the moving portion and shifting the image pickup element.

(2) An arrangement of magnetic poles of magnets provided to a shake correcting device of embodiments is not limited to those of the above embodiments as far as it can balance out rotation moments generated between closely arranged magnets.

FIG. 7A to FIG. 7D and FIG. 8A to FIG. 8D are views showing shake correcting devices of embodiments and modified embodiments.

Figure 7A:
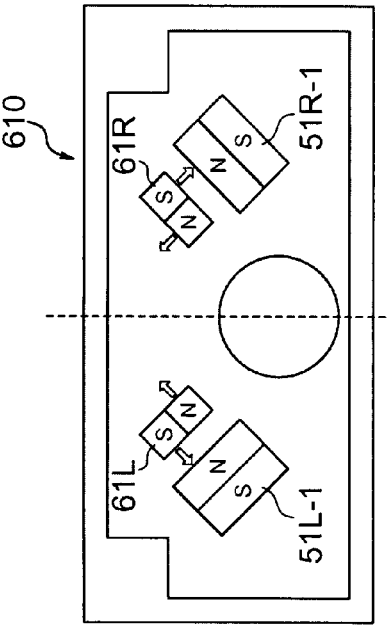
FIG. 7A to FIG. 7D are views each showing a shake correcting device of an embodiment or a modified embodiment.

FIG. 7A shows the shake correcting device 10 of the first embodiments.

Figure 7B:
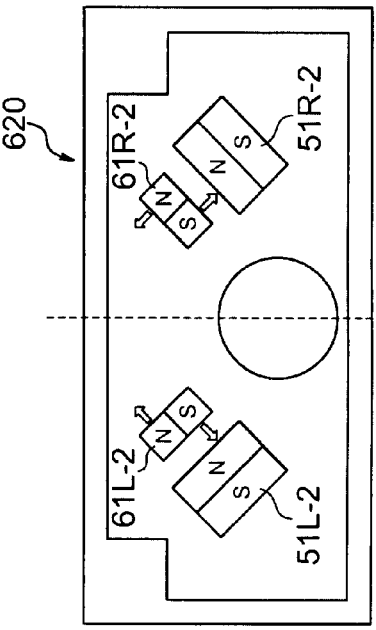

Instead of the magnets 61L and 61R in the shake correcting device 10 of the first embodiment shown in FIG. 7A, the shake correcting device 600 in FIG. 7B is provided with magnets 61L-0 and 61R-0 each having an inversed arrangement of south and north poles comparing with that in the first embodiment.

Figure 7C:
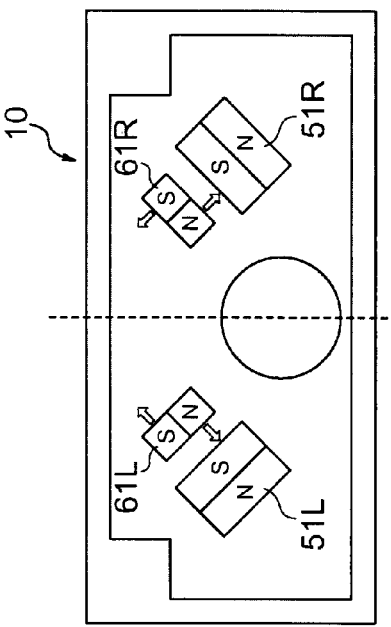

Instead of the magnets 51L and 51R in the shake correcting device 10 of the first embodiment shown in FIG. 7A, the shake correcting device 610 in FIG. 7C is provided with magnets 51L-1 and 51R-1 each having an inversed arrangement of south and north poles comparing with that in the first embodiment.

Figure 7D:
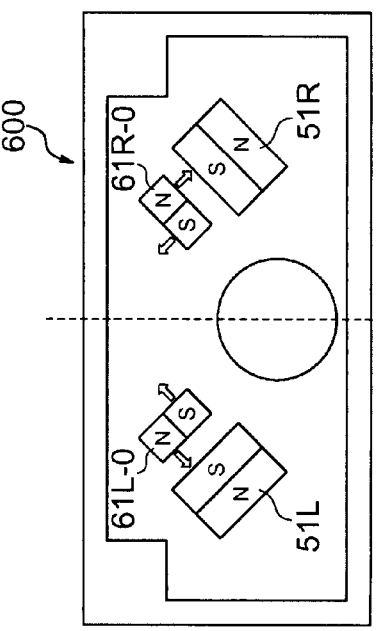

Instead of the magnets 51L and 51R and magnets 61L and 61R in the shake correcting device 10 of the first embodiment shown in FIG. 7A, the shake correcting device 620 in FIG. 7D is provided with magnets 51L-2 and 51R-2 and magnets 61L-2 and 61R-2 each having an inversed arrangement of south and north poles comparing with that in the first embodiment.

As shown in FIG. 7A to FIG. 7D, in the shake correcting devices 10, 600, 610 and 620, south and north poles of the magnets 51 of the VCM 50 and the magnets 61 of the position detecting portion 60 are respectively arranged in a plane symmetry with respect to a plane including the light axis A1 and the light axis A2 as a reference plane.

Instead of the magnets 51L and 61L in the shake correcting device 10 of the first embodiment shown in FIG. 7A, a shake correcting device 630 in FIG. 8A is provided with magnets 51L-3 and 61L-3 each having an inversed arrangement of south and north poles comparing with that in the first embodiment.

Instead of the magnets 51R and 61R in the shake correcting device 10 of the first embodiment shown in FIG. 7A, a shake correcting device 640 in FIG. 8B is provided with magnets 51R-4 and 61R-4 each having an inversed arrangement of south and north poles comparing with that in the first embodiment.

Instead of the magnets 51L and 61R in the shake correcting device 10 of the first embodiment shown in FIG. 7A, a shake correcting device 650 in FIG. 8C is provided with magnets 51L-5 and 61R-5 each having an inversed arrangement of south and north poles comparing with that in the first embodiment.

Instead of the magnets 51R and 61L in the shake correcting device 10 of the first embodiment shown in FIG. 7A, a shake correcting device 660 in FIG. 8D is provided with magnets 51R-6 and 61L-6 each having an inversed arrangement of south and north poles comparing with that in the first embodiment.

In each of the shake correcting devices shown in FIG. 7A to FIG. 7D and FIG. 8A to FIG. 8D explained above, directions of rotation moments respectively generated between closely arranged magnets become inverse, so that the same effects as those in the shake correcting device of the embodiment can be obtained.

(3) In the first embodiment, magnets of the VCM were arranged on the fixed portion and magnets of the position detecting portion were arranged on the moving portion. However, an arrangement of these magnets is not limited to that and may be an inversed arrangement of the above case and the magnets of the VCM may be arranged on the moving portion and the magnets of the position detecting portion may be arranged on the fixed portion.

Also, magnets of the VCM and position detecting portion in the third embodiment were all arranged on the moving portion. However, an arrangement of the magnets is not limited to that and these magnets may be arranged on the fixed portion.

What is claimed is:

1. A positioning device, comprising:
a first member provided with a first magnet arranged along a first axis and a second magnet arranged along a second axis intersecting with said first axis;
a first drive magnet and a second drive magnet provided to said first member;
a first drive coil provided to a second member to face said first drive magnet and a second drive coil provided to said second member to face said second drive magnet;
a drive member including a first yoke provided to said second member to face an opposite surface of a surface of said first drive coil facing said first drive magnet and a second yoke provided to said second member to face an opposite surface of a surface of said second drive coil facing to said second drive magnet, that relatively drives said first member and said second member by an electromagnetic action between said first drive coil and said first drive magnet, and between said second drive coil and said second drive magnet;
a first detection portion that detects a relative move of said first member and said second member with respect to said first axis direction in cooperation with said first magnet;
a second detection portion that detects a relative move of said first member and said second member with respect to said second axis direction in cooperation with said second magnet,
wherein a direction of a first rotation moment generated by an electromagnetic connection between said first yoke magnetized by said first drive magnet and said first magnet is opposite to a direction of a second rotation moment generated by an electromagnetic connection between said second yoke magnetized by said second drive magnet and said second magnet.

2. The positioning device as set forth in claim 1, wherein,
said first magnet is provided at a distance from said first yoke in a plane direction parallel to said first axis and said second axis; and
said second magnet is provided at a distance from said second yoke in the plane direction parallel to said first axis and said second axis.

3. The positioning device as set forth in claim 1, wherein,
said first magnet is polarized to a north pole and a south pole along a direction of the first axis;
said first yoke is polarized to a north pole and a south pole along a direction of the second axis;
said second magnet is polarized to a north pole and a south pole along a direction of the second axis; and
said second yoke is polarized to a north pole and a south pole along a direction of the first axis.

4. The positioning device as set forth in claim 1, wherein,
a size in a first direction of said first member is longer than a size in a second direction perpendicular to the first direction; and
said first magnet is provided in a symmetry with said second magnet in the first direction;
said first yoke is provided in a symmetry with said second yoke in the first direction.

5. The positioning device as set forth in claim 1, wherein,
a magnetic pole property of a closest part to said first magnet in said first yoke is the same as a magnetic pole property of a closest part to said second magnet in said second yoke;
a magnetic pole property of a center side of said first member in said first magnet is the same as a magnetic pole property of a center side of said first member in said second magnet.

6. The positioning device as set forth in claim 1, wherein,
a magnetic pole property of a closest part to said first magnet in said first yoke is the opposite of a magnetic pole property of a closest part to said second magnet in said second yoke; and a magnetic pole property of said first magnet in a center part of said first member is the opposite of a magnetic pole property of said second magnet in a center part of said first member.

7. The positioning device as set forth in claim 1, wherein, said first detection portion is provided on a surface of said second member facing to said first drive magnet and said second drive magnet; and said second detection portion is provided on a surface of said second member facing to said first drive magnet and said second drive magnet.

8. The positioning device as set forth in claim 1, further comprising:

a shake correcting optical system provided to one of said first member and said second member;

wherein said first magnet is provided to face said first drive magnet and said second magnet is provided to face said second drive magnet, said first magnet is provided not to face said first yoke and said first drive magnet is provided to face said first yoke with respect to an optical axis direction of said shake correcting optical system, said second magnet is provided not to face said second yoke and said second drive magnet is provided to face said second yoke with respect to an optical axis direction of said shake correcting optical system.

9. A shake correcting device, comprising:

the positioning device as set forth in claim 1; and a shake correcting optical system provided to one of said first member and said second member.

10. A shake correcting device, comprising:

the positioning device as set forth in claim 1; and an image pickup device provided to one of said first member and said second member.

11. The positioning device as set forth in claim 2, wherein, said first magnet is provided at a distance from said first yoke in the second axis direction; and said second magnet provided at a distance from said second yoke in the first axis direction.

12. Electronics comprising the shake correcting device as set forth in claim 9.

13. The shake correcting device as set forth in claim 9, wherein, said first drive magnet, said first drive coil and said first yoke generate a driving force in said second axis direction; and said second drive magnet, said second drive coil and said second yoke generate a driving force in said first axis direction.

14. Electronics comprising the shake correcting device as set forth in claim 10.

15. The shake correcting device as set forth in claim 10, wherein, said first drive magnet, said first drive coil and said first yoke generate a driving force in said second axis direction; and said second drive magnet, said second drive coil and said second yoke generate a driving force in said first axis direction.

16. The shake correcting device as set forth in claim 13, further comprising:

an operation switch that activates a shake correcting operation, wherein said first drive magnet, said first drive coil, said first yoke and said first magnet are provided to a closer side to said operation switch than the center of said shake correcting optical system; and said second drive magnet, said second drive coil, said second yoke and said second magnet are provided on the opposite side of said side closer to said operation switch than the center of said shake correcting optical system.

17. The shake correcting device as set forth in claim 15, comprising an operation switch that activates a shake correcting operation, wherein said first drive magnet, said first drive coil, said first yoke and said first magnet are provided to a closer side to said operation switch than the center of said image pickup device; and said second drive magnet, said second drive coil, said second yoke and said second magnet are provided to the opposite side of said side closer to said operation switch than the center of said image pickup device.

* * * * *